June 5, 1945.   F. D. CASIER   2,377,313
LIGHT SCREENING EYE PROTECTION
Filed May 4, 1943

INVENTOR,
Francis D. Casier
BY
Victor J. Evans & Co.
ATTORNEYS

Patented June 5, 1945

2,377,313

UNITED STATES PATENT OFFICE 2,377,313

LIGHT SCREENING EYE PROTECTION

Francis D. Casier, Massena, N. Y.

Application May 4, 1943, Serial No. 485,631

2 Claims. (Cl. 2—14)

My invention relates to eye protecting devices for welders and those engaged in work requiring light screening protection for the eyes, and has among its objects and advantages the provision of novel light screening means which may be worn with comfort and easily and quickly adjusted to permit various amounts of light to be screened to meet the needs of different working conditions. Broadly I make use of a lens assembly including a fixed Polaroid lens and a coaxial and rotary Polaroid lens which may be turned relatively to the fixed lens to vary the light screening properties of the lens assembly.

Figure 1:
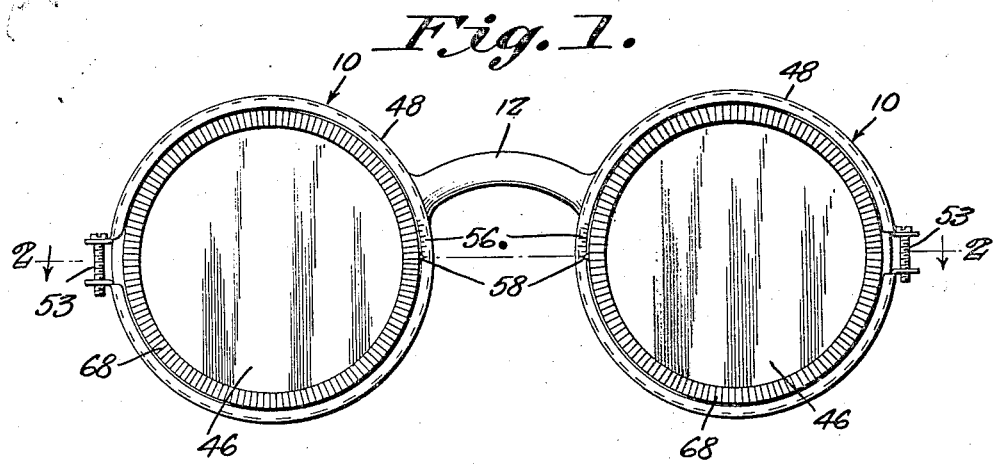
Figure 1 is a front view of goggles embodying my invention and of the style suitable for welding purposes.

In the embodiment of the invention selected for illustration, I make use of lens assemblies 10 connected by a nosepiece 12 and each provided with an eye shield 14 contoured at 16 to fit the face of the wearer. Openings 18 are provided in the shields 14 for the reception of attaching straps 20.

The lens assemblies 10 are of identical construction, each including an annular flange 22 against which is positioned a light screening lens 24. The shield 14 carries an annular extension 26 having snug fitting engagement with the peripheral face of the lens 24, and this extension is bent to provide an annular rib 28 and a flange 30 engaging the face of the lens 24 opposite the flange 22, so that the lens 24 is fixedly related to the shield 14.

Figure 2:
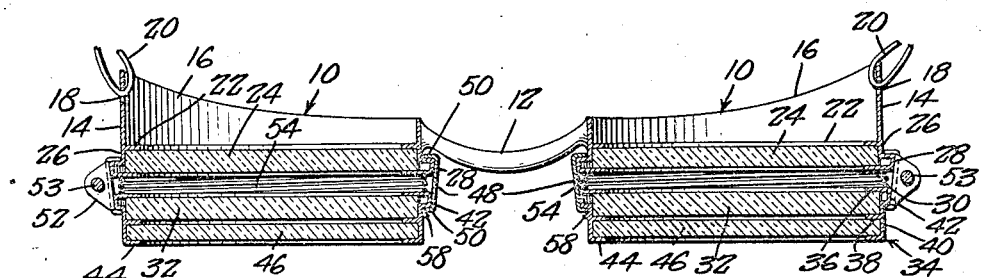
Figure 2 is a sectional view along the line 2—2 of Figure 1.

A second light screening lens 32 is arranged forwardly of the lens 24 and is supported in a ring 34 having flanges 36 and 38 between which the lens 32 is mounted. The ring 34 includes a tubular body 40 having engagement with the peripheral face of the lens 32, and this body is shaped to provide an annular rib 42 of smaller diameter than the rib 28. The two ribs are of uniform taper as illustrated in Figure 2.

A third annular flange 44 is formed on the ring 34 and coacts with the flange 38 for supporting an ordinary glass lens 46 constituting a shield for the lens 32. The lenses 24 and 32 are formed of light-polarizing material of the kind known in the trade as Polaroid.

Means for holding the ring 34 and its two lenses 32 and 46 in assembled relationship with the inner lens 24, comprises a band 48 having flanges 50 respectively engageable with the ribs 28 and 42, with the band tapered to lie against the peripheral faces of the two ribs. The ends of the band are bent to provide flanges 52 having openings for the reception of a tightening bolt 53 so that the band may be adjusted for diameter. Between the flanges 30 and 36 is interposed a compression spring 54, which spring exerts pressure on the ring 34 to frictionally relate the latter to the band 48. However, the outer lens assembly may be rotated relatively to the lens 24 by exerting slight inward pressure on the assembly to compress the spring 54, so that the lens 32 may be rotated relatively to the lens 24 to vary the light screening characteristics of the two coacting lenses.

In Figure 1, the bands 48 are provided with graduations 56 and the tubular bodies 40 are provided with pointers 58 coacting with the respective graduations 56 as an aid to determining the amount of rotation imparted to the outside lens assemblies.

Figures 3, 4:
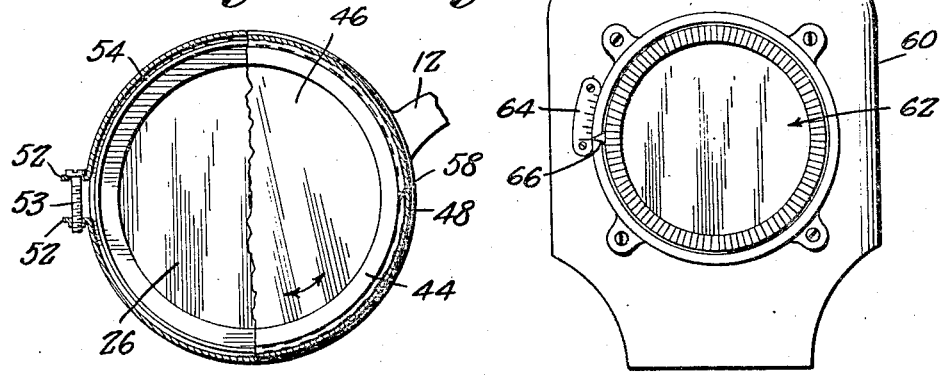
Figure 3 is a sectional detail view of one lens assembly.
Figure 4 is a face view of a hood or welder's shield.

Figure 4 illustrates the face view of a welding shield 60 having a lens means 62 identical with one of the complete lens assemblies of the goggles of Figures 1 through 3. The shield 60 includes a scale 64 coacting with a pointer 66 rotatable with the outer lens assembly.

The flanges 44 are knurled at 68 so that a good grip may be secured thereon.

Without further elaboration, the foregoing will so fully explain my invention, that others, may, by applying current knowledge, readily adapt the same for use under various conditions of service.

I claim:

1. In light screening goggles, the combination of two eye shields and a nosepiece connecting the same, each eye shield comprising a face engaging member having a pair of spaced flanges and a rib formed on one of the flanges, a lens of light-polarizing material fixedly mounted between the flanges, a second lens of light-polarizing material, a ring supporting said second lens and having an annular rib, a band engaging the two annular ribs to hold said ring and said second lens in coaxial relationship with said first mentioned lens, said ring being rotatably guided by said band, spring means interposed between said ring and said tubular part to frictionally support the ring and said second lens against relative accidental rotation with respect to said first mentioned lens and a shielding lens over said second named lens.

2. In a light screening eye protector of the type having lens frames and a nose piece connecting the elements of the frame, each lens frame having a ring member detachably connected with the frame, said connecting means including a rib on the frame and a rib on the ring, and a flanged ring adjustably engaged about the ribs of the frame and ring whereby the ring is rotatab[le] with respect to the frame, a compression sprin[g] between the ring and frame to resist accident[al] rotational movement of the ring, a plurality [of] spaced lenses, one carried by the frame, and th[e] lens carried by the frame and one of the lens[es] carried by the ring being formed of light-pola[r]izing material.

FRANCIS D. CASIER.